T. L. COURTNEY.
SHOCK ABSORBING ROAD WHEEL FOR MOTOR CARS AND THE LIKE.
APPLICATION FILED SEPT. 13, 1921.
1,435,051. Patented Nov. 7, 1922.
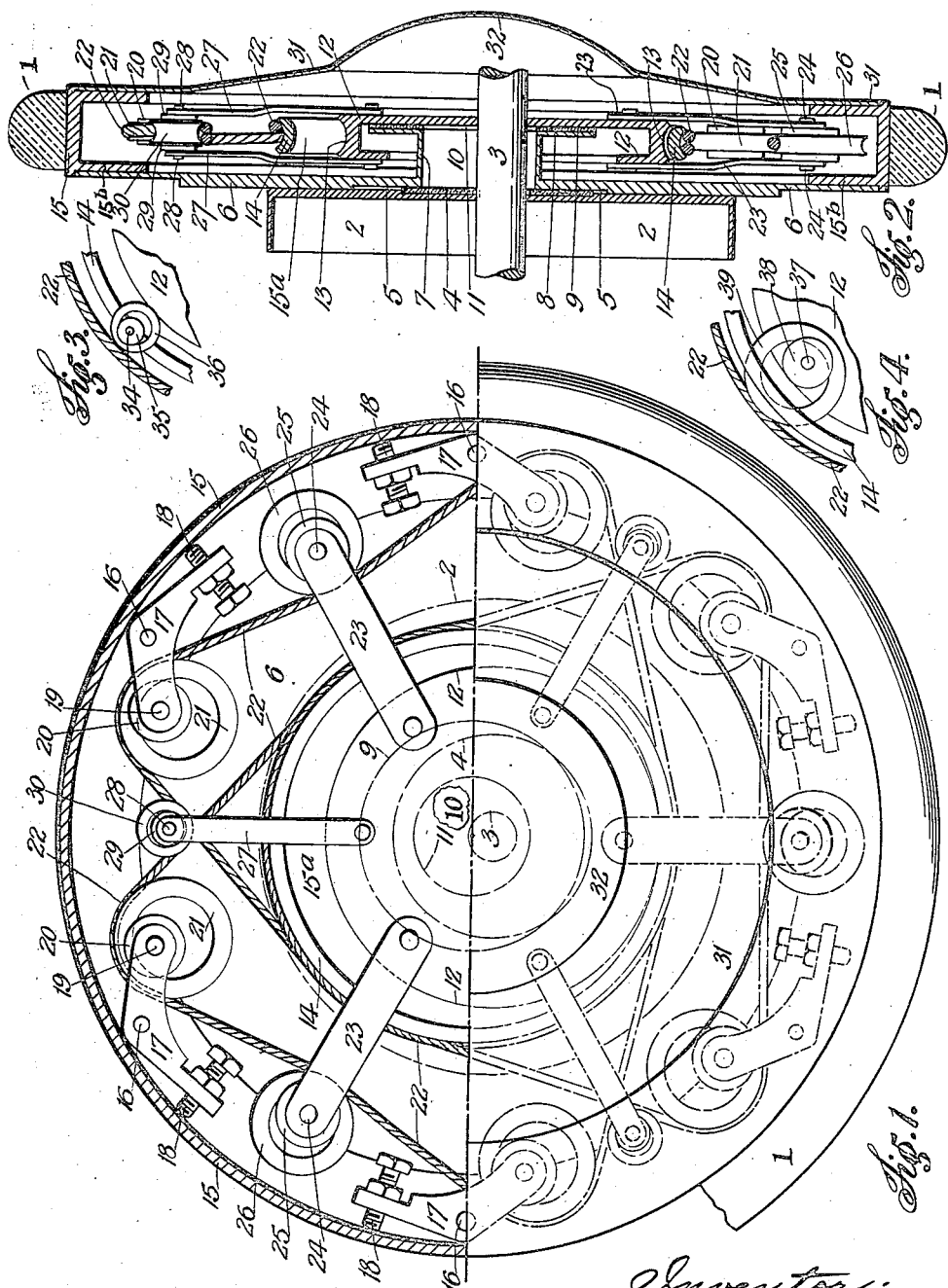

Patented Nov. 7, 1922.

1,435,051

UNITED STATES PATENT OFFICE.

THOMAS LEE COURTNEY, OF WYCHITELLA, VICTORIA, AUSTRALIA, ASSIGNOR OF TWO-THIRDS TO HUGH KEITH, JR., OF WYCHITELLA, VICTORIA, AUSTRALIA.

SHOCK-ABSORBING ROAD WHEEL FOR MOTOR CARS AND THE LIKE.

Application filed September 13, 1921. Serial No. 500,377.

*To all whom it may concern:*

Be it known that I, THOMAS LEE COURTNEY, a subject of the King of Great Britain and Ireland, etc., residing at Wychitella, in the State of Victoria, Commonwealth of Australia, have invented certain new and useful Improvements in Shock-Absorbing Road Wheels for Motor Cars and the like; and I do hereby declare the following to be a full, clear, and exact description of the invention, such as will enable others skilled in the art to which it appertains to make and use the same.

This invention relates to motor car and other vehicle wheels of the kind wherein through intermediate means the hub is yieldingly connected with the rim, whereby shocks to the hub (through the axle) or to the rim (from the road) will be absorbed or distributed. Thus axles and bodies of cars will in a large degree escape the force of shocks from road inequalities and other causes.

The invention is such that varying axle loads are yieldingly provided for; and, for elimination or reduction of shock during travel, tensioned adjustable cable devices are employed, with such repetitions of elements as to promote advantageous manufacturing and maintenance conditions.

A wheel according to this invention contains a hub element to enclose the axle, this hub element being loosely encircled by a distributing ring which is within, and of such lesser diameter than, the wheel rim that space is left between the ring and rim for cable mechanism to be described.

Compensating tension cables are employed so located that rim movement relatively to the hub varies the positions of the intermediate parts, and, instead of transmitting shock, is expended, or largely so, without being conveyed to the hub. The hub element by gravity locates itself eccentrically of the distributing ring, and its base may meet the ring interior and ride thereon, but the ring is of sufficiently large internal diameter to avoid hub contact at other points.

The cables bear on and pass around guiding rings and also around the distributing ring, all the parts forming co-acting shock asorbing members.

The details of construction as aforesaid and of incidental features are stated in the following description, and illustrated by the accompanying drawings.

Figure 1 is a view of a wheel partly in vertical section, part of the tyre being omitted.

Figure 2 is a vertical section transversely through the said wheel.

Figures 3 and 4 are views of modified details.

To avoid confusion in the drawing some parts shown in Figure 1 are omitted from Figure 2, and conversely.

Additions or omissions of minor parts, and modifications are practicable within the scope of the claims.

The drawings are diagrammatic and not to scale.

The wheel tyre 1 is not necessarily solid, or of resilient material, and the wheel has if required a brake drum 2 carried by the axle 3.

4 is a ring or washer to take up wear, loosely set in an enlarged recess 5 in a cheek 6, of disc form as shown, but the precise form and size of which are variable. Part of ring 4 is shown in a recess of drum 2. The cheek 6 has a boss 7 loosely encircling axle 3, and having a bearing flange 8, flanked by a loose washer 9 which will take up wear, the boss and washer having respective enlarged axle holes 10, 11 which permit of movements of the cheek and the axle independently of one another.

The wheel has a hub element 12 which bears against washer 9 and surrounds the axle, element 12 having a flange with a circular periphery 13, which is grooved for locating in proper contact with its lower surface the inner side of the base of a distributing ring 14 which very loosely encloses periphery 13, and thus provides an internal space 15ª, the form of which during travel of the wheel changes according to movements produced chiefly by road inequalities and speed and load variations.

The wheel has any suitable rim 15, shown as a channelled ring, to form the outer part of a chamber in which is contained the wheel mechanism. In order to safeguard the said mechanism and to exclude dust a removable cover plate 31 is attached to the rim 15; its central portion 32 is shown domed, but it is not essential that the rim or coverplate be of the cross sections illustrated. The rim carries cable tensioning means illustrated by pivot pins 16 journaled in the inwardly-projecting flanges 15$^b$ on the rim, on each of which pins is an adjustable lever 17 carrying at one end adjusting means shown as a setscrew (with lock nut) 18, and at the other end an axle 19 of a grooved friction roller 20 which is very loosely encircled by a grooved cable guide ring 21.

The cables or flexible bands 22 are passed each around part of the distributing ring 14, and each around a plurality of outer guide rings 21, and each, in the case illustrated in Figures 1 and 2, against a grooved tensioning guide ring 26, and, to carry the latter rings, there are pivoted to element 12 radiating arms 23 which carry axle pins 24 of grooved friction rollers 25 each loosely encircled by a guide ring 26. The cables illustrated form distorted triangles with curved angles, and symmetrically intersect except at their bases.

To further associate the cables with hub element 12 or to associate them further with ring 14 a series of radiating arms 27 pivoted to part 12 extend to cable intersections, and carry axle pins 28 bearing friction rollers 29 loosely encircled by grooved cable bearing rings 30 which the intersecting cables engage. Distribution of shocks will thus be facilitated.

When a shock is being inwardly transmitted by rim element 15, space 15$^a$ is caused to alter its form around hub element 12 in response to stresses produced, having in view the direction and force of the shock, and the direction of travel, and speed of the car.

These shocks cause rings 14, 26 and 21 to rock somewhat, and cause the said rings and cables to creep or rotate to some extent while the shocks become rolled out or absorbed through the said motions. Rings 30 may move slightly.

Among the structural modifications which may be made, are the details in Figure 3 or 4. In the case of Figure 3 there would be a series of rollers 35 each on an axle 34 on distributing ring 14, and each roller loosely encircled by a cable ring 36, which bears on hub element 12, the said looseness allowing of parts 12 and 14 moving independently in the wheel plane.

In the case of Figure 4, element 12 carries a series of axle pins 37 each with a roller 38 which is loosely encircled by a grooved cable bearing ring 39, projecting beyond ring 14.

It will be perceived that the grooved rings external of the distributing ring 12, might also be described as eccentrically mounted pulleys; and that as part of the shock absorbing means there is not only a space 10 round axle 3, within boss 7 of cheek 6 but there is also another space 15$^a$ around hub element 12, and still another space around the distributing ring 14 within the wheel rim 15.

Grooving of rollers 20, 25 is preferred but not essential; in some cases these rollers are omitted as guide rings 21, 26 will perform their functions if they bear on suitable axles which may be rotatable.

What I claim is:—

1. A shock absorbing wheel containing at one side a cheek having a hollow boss to loosely surround an axle, and at the other side a hub element having an aperture to enclose the axle and having a peripheral flange which loosely surrounds the boss, the flange being loosely encircled by a distributing ring which is enclosed at a distance by a rim element, the said cheek being arranged alongside the said rim element, flexible band supporting means connected to the rim element, flexible band supporting means connected to the hub element, and flexible bands engaging each said supporting means and the distributing ring.

2. A shock absorbing wheel containing at one side a cheek having a boss adapted to loosely surround an axle, a hub element having a periphery which loosely surrounds the boss, a distributing ring which loosely surrounds the said periphery, a rim element which surrounds the said ring at a distance from it, the said cheek being arranged alongside the said rim element, guide rings outward of the distributing ring, means for rotatively supporting the guide rings, and, yieldingly associating the aforesaid parts, flexible bands extending over the distributing ring and the guide rings.

3. A shock absorbing wheel containing at one side a cheek having a boss adapted to loosely surround an axle, a hub element having a periphery which loosely surrounds the boss, a distributing ring which loosely surrounds the periphery, a rim element which surrounds the said ring at a distance from it, the said cheek being arranged alongside the said rim element, guide rings outward of the distributing ring, a series of rollers, means pivotally connected to the rim element and supporting said rollers, each of said guide rings loosely encircling one of said rollers, and flexible bands extending over the distributing ring and the guide rings.

4. A shock absorbing wheel containing at one side a cheek having a boss adapted to loosely surround an axle, a hub element having a periphery which loosely surrounds the boss, a distributing ring which loosely surrounds the periphery, a rim element which surrounds the said ring at a distance from it, the said cheek being arranged alongside the said rim element, guide rings outward of the distributing ring, a series of rollers, adjustable means pivotally connected to the rim element and supporting said rollers, each of said guide rings loosely encircling one of said rollers, and flexible bands extending over the distributing ring and the guide rings.

5. A shock absorbing wheel containing a rim element carrying a series of adjustable pivoted supports each carrying a guide ring, a distributing ring encircled by the rim element, a hub element loosely encircled by the distributing ring, a series of supports extending from the hub element, each carrying a guide ring loosely encircling such support, and flexible bands which intersect one another and are each tensionally extended over the distributing ring and over guide rings supported from the rim element and over a guide ring supported from the hub element.

6. A shock absorbing wheel carrying within its rim a series of guide rings loosely enclosing their supports, said supports being connected to the rim, a distributing ring encircled at a distance by the rim and surrounded by the said guide rings, a hub element having a flange encircled loosely by the distributing ring, guide rings loosely encircling supports on the hub element, flexible bands extended over the distributing ring and the guide rings of the rim and of the hub element, and a wheel cheek having a boss which is apertured to loosely enclose the axle, the boss being loosely encircled by the flange of the hub element.

In witness whereof I have hereunto set my hand.

THOMAS LEE COURTNEY.